(12) United States Patent
Kumazawa et al.

(10) Patent No.: US 7,447,522 B2
(45) Date of Patent: Nov. 4, 2008

(54) CARD HOLDING STRUCTURE FOR CELLULAR PHONE

(75) Inventors: Kazuya Kumazawa, Tokyo (JP); Kazuo Oosawa, Tokyo (JP)

(73) Assignee: NEC Corporation, Tokyo (JP)

( * ) Notice: Subject to any disclaimer, the term of this patent is extended or adjusted under 35 U.S.C. 154(b) by 306 days.

(21) Appl. No.: 10/671,667

(22) Filed: Sep. 29, 2003

(65) Prior Publication Data

US 2004/0063462 A1 Apr. 1, 2004

(30) Foreign Application Priority Data

Oct. 1, 2002 (JP) .............................. 2002-289070

(51) Int. Cl.
*H04B 1/03* (2006.01)
(52) U.S. Cl. ....................... 455/558; 361/814
(58) Field of Classification Search ................. 455/558, 455/559, 575.1, 90.2; 361/814, 801; 439/325, 439/630
See application file for complete search history.

(56) References Cited

U.S. PATENT DOCUMENTS

| | | | |
|---|---|---|---|
| 5,831,256 A * | 11/1998 | De Larminat et al. ....... | 235/486 |
| 6,175,505 B1 * | 1/2001 | Cheng et al. ................. | 361/752 |
| 6,226,189 B1 * | 5/2001 | Haffenden et al. .......... | 361/814 |
| 6,343,018 B1 * | 1/2002 | Takeyama et al. ........... | 361/737 |
| 6,461,193 B1 * | 10/2002 | Matthies ..................... | 439/509 |
| 6,947,767 B2 * | 9/2005 | Haga et al. .................. | 455/558 |
| 2002/0094841 A1 * | 7/2002 | Sakaguchi et al. .......... | 455/558 |
| 2003/0069040 A1 * | 4/2003 | Chuang et al. .............. | 455/558 |
| 2005/0255753 A1 * | 11/2005 | Buschmann ................. | 439/630 |

FOREIGN PATENT DOCUMENTS

| | | |
|---|---|---|
| GB | 2 327 792 A | 2/1999 |
| GB | 2 328 772 A | 3/1999 |
| JP | 11-155004 A | 6/1999 |
| JP | 2000-215952 A | 8/2000 |
| JP | 2001-244004 A | 9/2001 |
| JP | 2001-307027 A | 11/2001 |
| JP | 2002-218032 A | 8/2002 |
| WO | WO 01/27863 A1 | 4/2001 |

* cited by examiner

*Primary Examiner*—Blane J Jackson
(74) *Attorney, Agent, or Firm*—Sughrue Mion, PLLC

(57) ABSTRACT

There is provided a card holding structure that holds a SIM card in a housing without covering with a chargeable battery case to hold the SIM card. A card connector is fixed on a board of a portable terminal. The card is held by card holding portions provided at a front part of the card in a sliding direction of the card connector. A slope 4 provides a stopper, which slope is formed by a rectangular elastic piece, one end of which is fixed to a housing.

19 Claims, 5 Drawing Sheets

CARD HOLDING STRUCTURE FOR CELLULAR PHONE

BACKGROUND OF THE INVENTION

1. Field of the Invention

The present invention relates to a portable terminal such as a cellular phone and, more particularly, to a structure for holding an identification card like the SIM card.

2. Description of the Related Art

Conventionally, Japanese Patent Laid-Open No. 2001-244004 has proposed an invention relating to a card holding structure in which a SIM (Subscriber Identification Module) card, which is an identification card for a cellular phone, is mounted by being slid and is held on a card connector fixed in a card mounting portion provided in a case of a portable terminal. According to Japanese Patent Laid-Open No. 2001-244004, this invention is characterized in that a front part of the card is held by a card holding portion provided at a front part in the card sliding direction of the card connector, and a rear part of the card is held by an internal wall surface of a chargeable battery case cover that is also used as a chargeable battery for the portable terminal.

However, the chargeable battery case requires a place for fitting it in a housing, and a spring type contact is often used for electrical connection between the chargeable battery case and the housing. Therefore, if the aforementioned invention is used, the holding of the chargeable battery and the housing is often unstable, so that there arises a problem in that an error occurs in reading the card.

SUMMARY OF THE INVENTION

The present invention has been made to solve the above problem, and accordingly an object thereof is to hold a card in a housing and to achieve both high reliability and low cost and expand the mounting area of electrical parts by using an inexpensive SIM card connector.

To achieve the above object, the present invention provides a card holding structure having a card insertion port provided in a battery holding concave portion of an internal housing and a slope which is provided near the card insertion port to guide the insertion of a card into the internal housing.

Also, the present invention provides a card holding structure having a card connector which is provided on a circuit board to hold a card and means for pressing the card against a card connector in an internal housing.

Further, the present invention provides a card holding structure which slides and mounts a card on a SIM card connector fixed on a board in a portable terminal, wherein a front part of the card is held by a card holding portion provided at a front part in the card sliding direction of the SIM card connector; and a slope that is also used as a stopper, which slope is formed by a rectangular elastic piece one end of which is fixed to a housing, is provided.

DETAILED DESCRIPTION OF THE PREFERRED EMBODIMENTS

Embodiments of the present invention will now be described with reference to the accompanying drawings.

Figure 1:
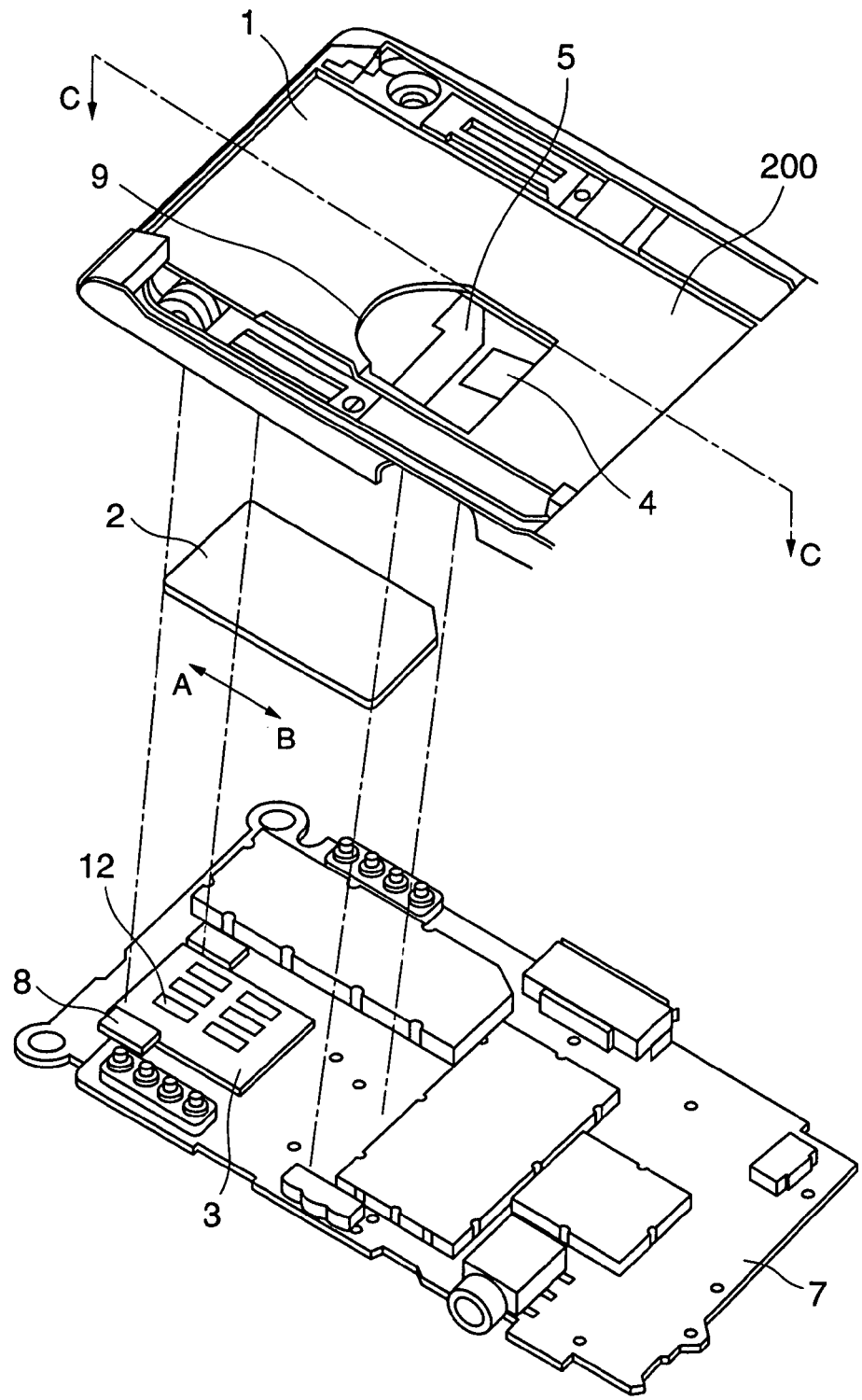
FIG. 1 is a construction view of a card holding structure in accordance with a first embodiment of the present invention.
Figure 3:
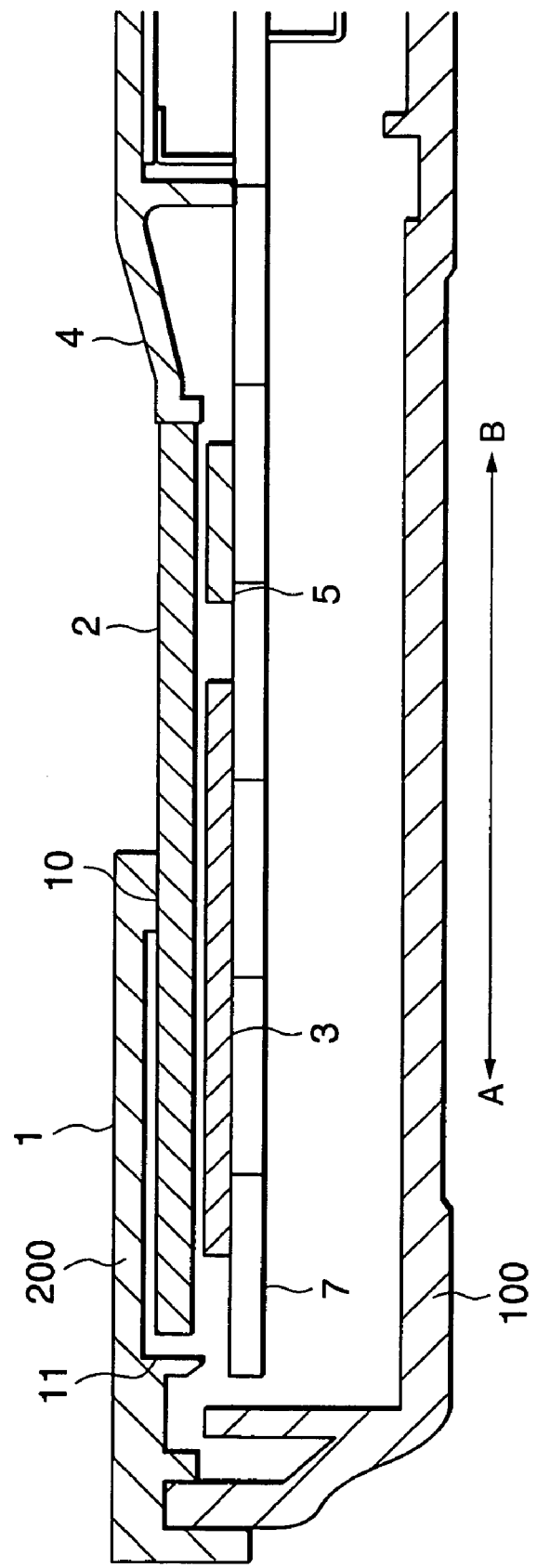
FIG. 3 is a sectional view taken along the line C-C of FIG. 1, showing a state in which a cardholding structure in accordance with a first embodiment of the present invention is assembled.

FIG. 1 is an exploded perspective view showing a first embodiment of the present invention, showing a card holding structure for a cellular phone. FIG. 3 is a sectional view showing a state in which the card holding structure shown in FIG. 1 is assembled. In FIGS. 1 and 3, an internal housing 200 is fixed to an external housing 100. The internal housing 200 is formed with a battery holding concave portion 1 to install a cover that is also used as a battery. The battery holding concave portion 1 is provided with a card insertion port 9 for mounting a card 2.

The card insertion port 9 is provided a slope 4 that is also used as a stopper. The slope 4 is formed by a rectangular elastic piece one end of which is fixed to the housing so as to slide the card 2 on the slope 4. The card 2 is inserted through the card insertion port 9. At both sides at a front part (direction A) of the inserted card, there are provided the card holding portions 8 of a card connector 3 lying on a circuit board 7 in the housing. The card holding portions 8 holds the inserted card. Also, the end face at a rear part (direction B) of the card 2 comes into contact with the slope 4 provided in the internal housing 200 to prevent the card 2 from popping out. Thus, the card 2 is fixed without moving.

Also, the internal housing 200 has a card receiving portion 5 to prevent the card 2 from sinking due to a force to the circuit board 7 when the card 2 is taken out through the card insertion port 9 by hand. Thereby, the deflection of the card 2 is made fixed, and a burden on the card 2 is alleviated. Since the card receiving portion 5 is not provided under the slope 4, a space between the slope 4 and the circuit board 7 can be secured as a parts mounting space.

Figure 2:
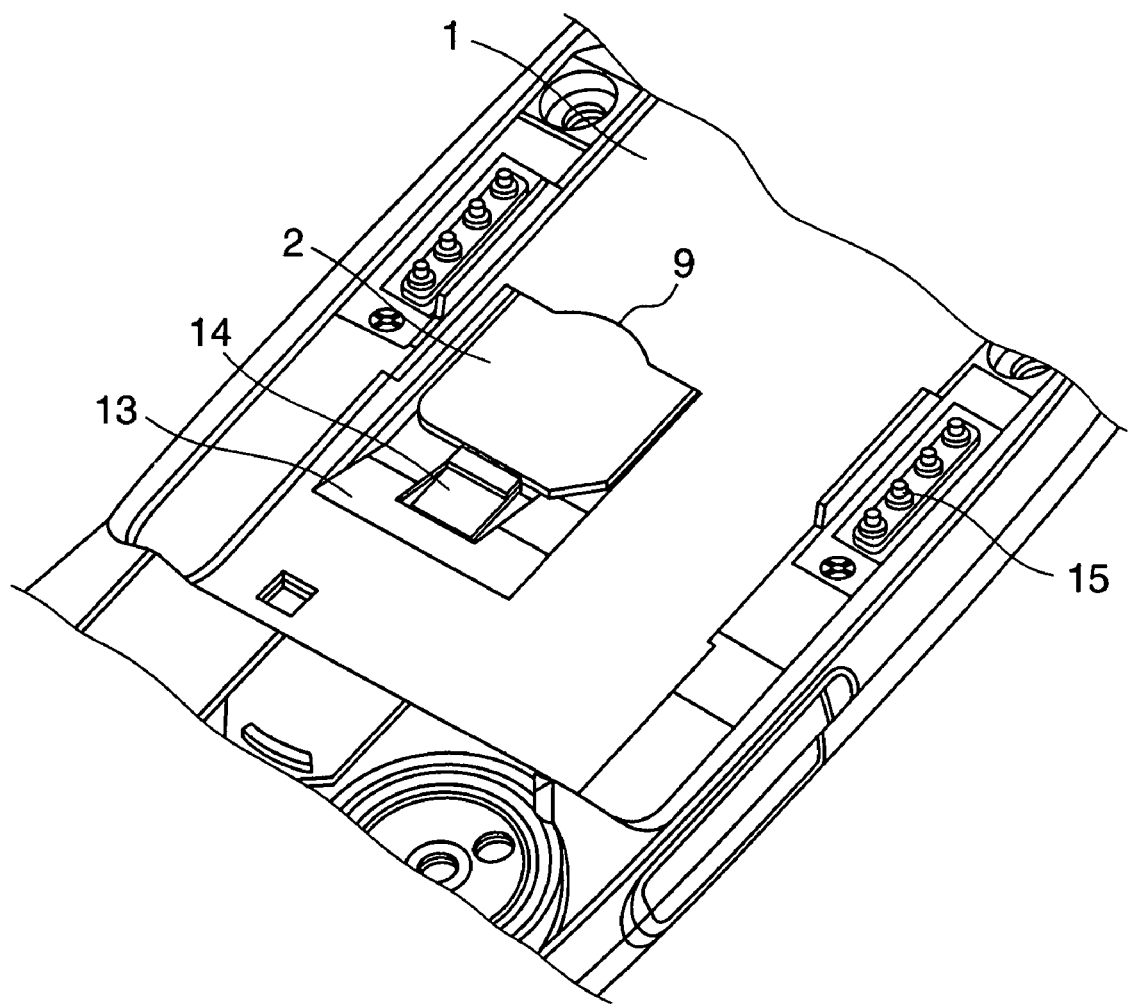
FIG. 2 is a construction view showing a card holding structure in accordance with a modification of a first embodiment of the present invention.

The slope 4 that is also used as a stopper may be formed by two separate parts of a slope 13 and a stopper 14 as shown in a modification shown in FIG. 2.

In FIG. 3, the card 2 is pressed against the card connector 3 on the circuit board 7 in the housing by a protrusion 10 provided on the internal housing 200 so that the card connector 3 comes into contact with the card 2. A contact pressure is secured by the card connector 3 and the protrusion 10. Also, in the battery holding concave portion 1, a holding rib 11 is provided on the end face in front of the card to hold the position of the card 2. The card 2 comes into contact with a connector contact 12 at a proper or predetermined position by the holding rib 11.

As described above, in the first embodiment of the present invention, the slope 4 prevents the card 2 from popping out, and the internal housing 200 presses the card 2 against the card connector 3, so that an electrical part mounting area can be expanded while the reliability is maintained.

Figure 4:
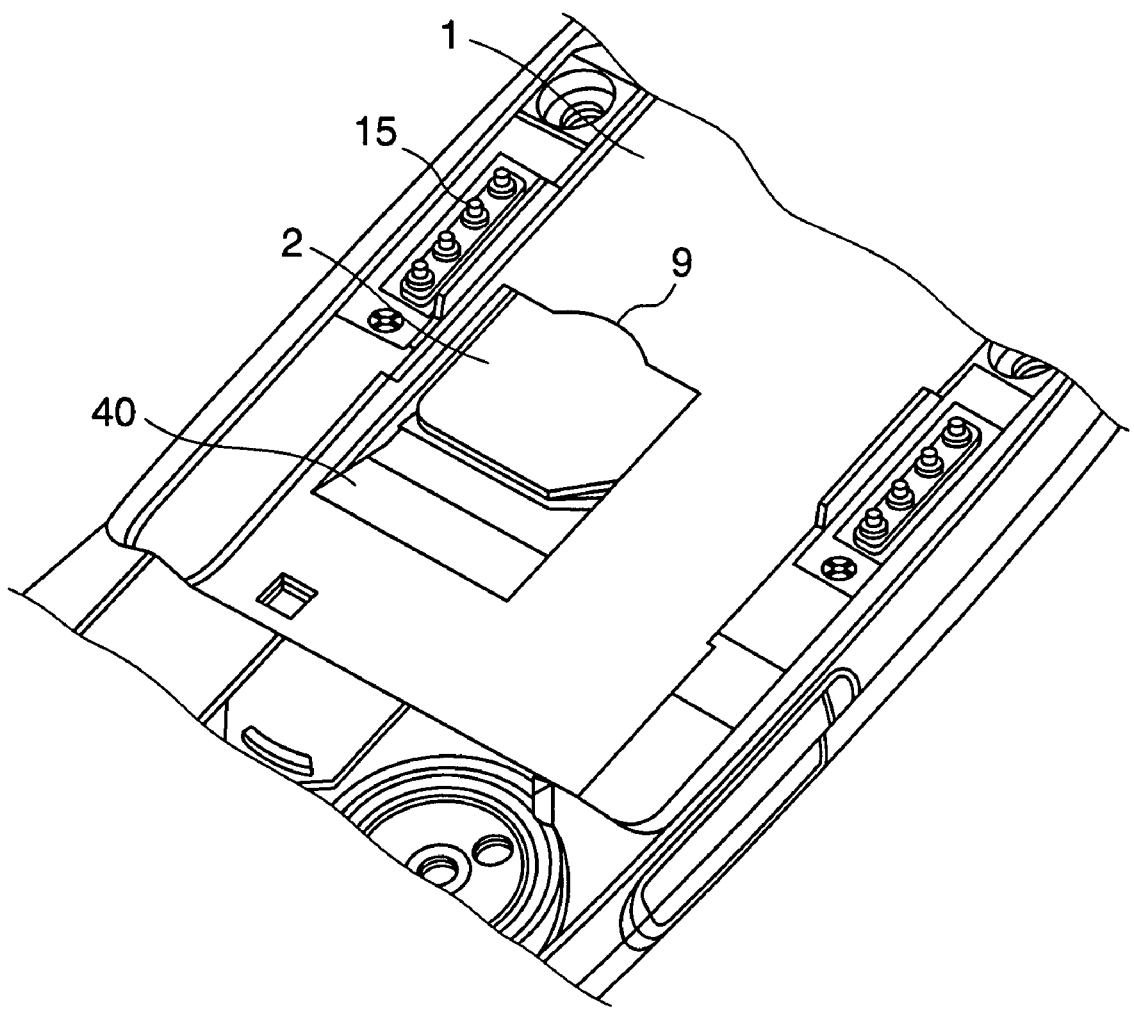
FIG. 4 is a perspective view of a card holding structure in accordance with a second embodiment of the present invention.

FIG. 4 is a perspective view of a card holding structure for a cellular phone in accordance with a second embodiment of the present invention. In FIG. 4, a slope 40 that is also used as a stopper, one end of which is fixed to the housing, is provided at the card insertion port 9. It is preferable that the slope 40 have a shape such that one corner at the rear of the card is cut to show the direction in which the card is inserted. By making the shape of the slope 40 same as that of the card 2, it can be expected to reduce mistaken insertion of the card 2. For other cards, the shape of the slope 40 is subject to the shape of that card.

Figure 5:
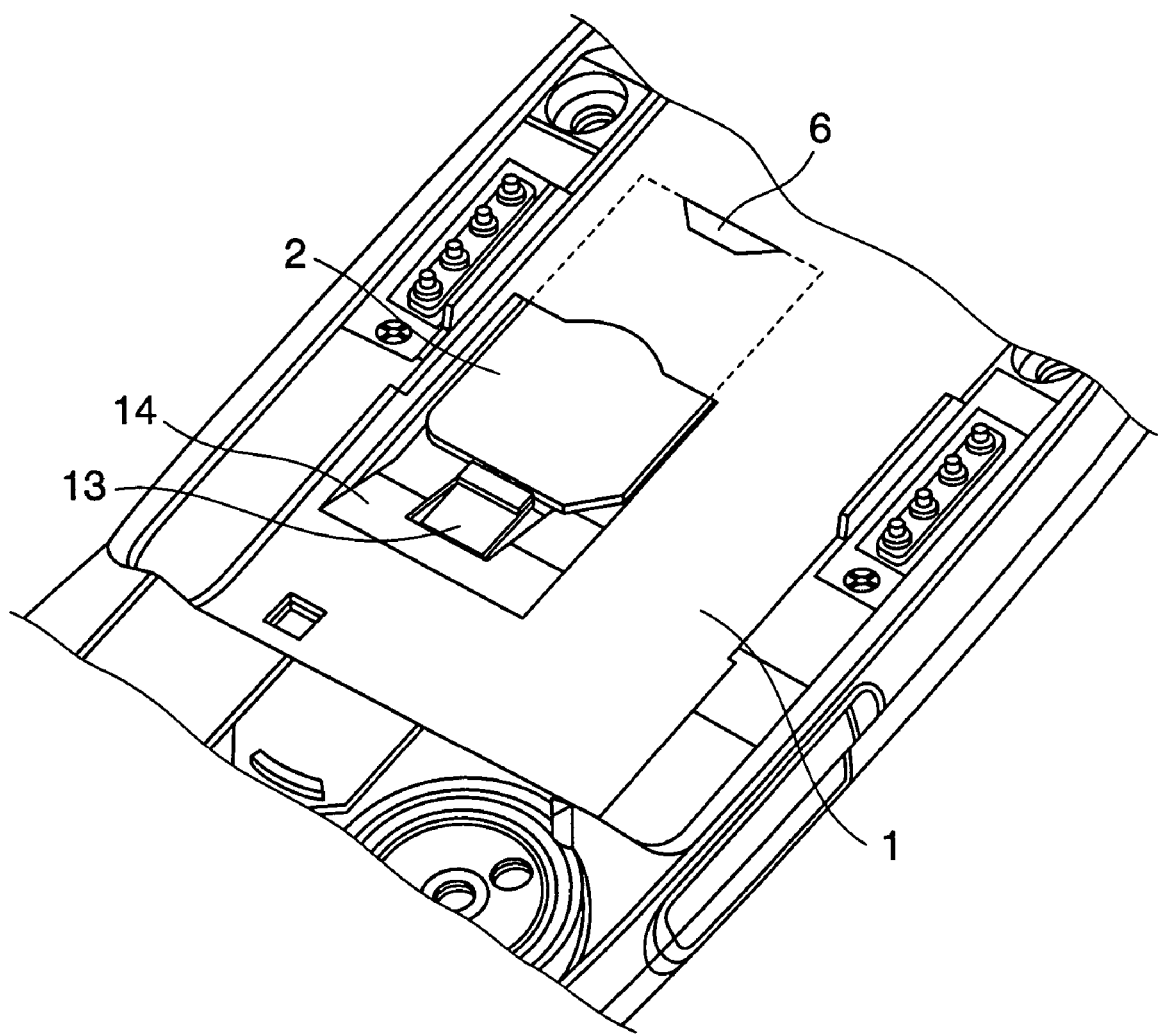
FIG. 5 is a perspective view of a card holding structure in accordance with a third embodiment of the present invention.

FIG. 5 is a perspective view for illustrating a cellular phone in accordance with a third embodiment of the present invention. In FIG. 5, a check opening 6 is provided to check whether the card 2 has been inserted in the housing exactly. In case the card cannot be taken out, the card can be pushed out with a finger or a rod-shaped object through the check opening 6.

As described above, according to the card holding structure in accordance with the present invention, some of holding operation for the identification card can be performed within the housing, and hence the cost can be reduced. Also, the card can be held more stably than in the case where the card is held by a battery cover.

What is claimed is:

1. A card holding structure in an internal housing comprising:
   a card insertion port provided in a battery holding concave portion of the internal housing;
   said card insertion port comprising a slope to guide the insertion of a card into said internal housing, wherein one end of the slope has an edge for abutting the card in a predetermined position and the other end is integral with the internal housing; and
   a card connector for holding said card in the predetermined position.

2. The card holding structure according to claim 1, wherein said internal housing is provided with a holding rib for inserting said card to the predetermined position.

3. The card holding structure according to claim 1 or 2, wherein said internal housing which covers said card connector has a check opening.

4. The card holding structure according to claim 3, wherein said card is visible in said check opening only when said card is positioned in the predetermined position in said internal housing.

5. The card holding structure according to claim 1, wherein said internal housing comprises a card covering portion and wherein the card covering portion is provided with at least one protrusion extending in a direction toward the card connector and retaining said card in said predetermined position.

6. The card holding structure according to claim 5, wherein the at least one protrusion is located substantially over the card connector.

7. The card holding structure according to claim 6, wherein said card is pressed against said card connector by the at least one protrusion.

8. The card holding structure according to claim 5, wherein the at least one protrusion is formed on a surface of the card covering portion which faces the card.

9. The card holding structure according to claim 1, wherein said internal housing is provided with a card receiving portion limiting movement of said card in a specified direction the card within said internal housing.

10. The card holding structure according to claim 1, wherein the integrally formed end of the slope is integral with the battery holding concave portion of the internal housing at an area defined by the card insertion port.

11. The card holding structure according to claim 10, wherein the card abutting end of the slope extends into the internal housing.

12. The card holding structure according to claim 1, wherein the card does not contact the sloped portion of the slope in the predetermined position.

13. The card holding structure according to claim 1, wherein the card is parallel to the card connector in the predetermined position.

14. The card holding structure according to claim 1, wherein the card abutting edge end of the slope is located down the slope from the integrally formed end.

15. The card holding structure according to claim 1, wherein the card abutting end of the slope is cut off to create an edge for abutting the card.

16. The card holding structure according to claim 1, wherein the card abuts the outermost edge of the card abutting end of the slope in the predetermined position.

17. The card holding structure according to claim 1, wherein the slope does not support the card in the predetermined position.

18. A card holding structure in an internal housing comprising:
    a card insertion port provided in a battery holding concave portion of an internal housing;
    a slope part which is provided in said card insertion port to guide the insertion of a card into said internal housing;
    a stopper part located in said slope part, wherein the stopper part is ductile so as to conform to the slope of the slope part when pressure is applied, and wherein the stopper part abuts the card in a predetermined position; and
    a card connector for holding said card,
    wherein the slope part does not support the card in the predetermined position.

19. The card holding structure according to claim 18, wherein the card is parallel to the card connector in a predetermined position.

* * * * *